(12) United States Patent  
Gigger

(10) Patent No.: US 8,210,382 B2
(45) Date of Patent: Jul. 3, 2012

(54) LOCKING MECHANISM FOR HOME HEATING FUEL OIL FILL PORT

(76) Inventor: Thorsten Gigger, Farmingville, NY (US)

( * ) Notice: Subject to any disclaimer, the term of this patent is extended or adjusted under 35 U.S.C. 154(b) by 955 days.

(21) Appl. No.: 12/208,038

(22) Filed: Sep. 10, 2008

(65) Prior Publication Data

US 2010/0058819 A1   Mar. 11, 2010

(51) Int. Cl.
   *B65D 45/00* (2006.01)
(52) U.S. Cl. .................................................. 220/315
(58) Field of Classification Search .......... 220/315, 220/814, 783, 249; 70/63
   See application file for complete search history.

(56) References Cited

U.S. PATENT DOCUMENTS

| | | | | |
|---|---|---|---|---|
| 2,462,951 A | * | 3/1949 | Doubble | 220/725 |
| 4,146,146 A | * | 3/1979 | Mar | 215/213 |
| 6,082,157 A | * | 7/2000 | Boyce | 70/58 |
| 6,581,424 B2 | * | 6/2003 | Oliver | 70/164 |
| 7,040,499 B1 | * | 5/2006 | Reif | 220/291 |
| 2004/0118170 A1 | * | 6/2004 | Smith et al. | 70/178 |

* cited by examiner

*Primary Examiner* — Mickey Yu
*Assistant Examiner* — Rafael Ortiz
(74) *Attorney, Agent, or Firm* — Michael I. Kroll

(57) ABSTRACT

Undesired access to a fuel oil fill pipe having a threaded cap fitting and a threaded cap is prevented by a fuel oil fill-port locking mechanism having: a coupling mateable with the fuel oil fill pipe; a nipple mateable with the coupling the cap fitting; an oil fill-port cover which denies access to the cap; a pair of oppositely disposed apertures in the coupling and a pair of alignable apertures in the cover; a lock pin sized to fit through the aligned aperture; a transverse bore through one end of the lock pin; and a lock pin stop at an opposite end of the lock pin. The cap and the cap fitting are removed from and the coupling is threaded onto the fuel oil fill pipe, the nipple is threaded into the coupling, then the cap fitting threaded into the nipple and the cap threaded into the cap fitting. The oil fill-port cover is placed over and denies access to all the fittings, the apertures are aligned and the lock pin inserted through the apertures and a lock affixed through the lock pin bore to prevent removal of the lock pin.

20 Claims, 14 Drawing Sheets

LOCKING MECHANISM FOR HOME HEATING FUEL OIL FILL PORT

BACKGROUND OF THE INVENTION

1. Field of the Invention

The present invention relates generally to pipe covers and, more specifically, to an oil fill-port cover that is retrofitted to a home owner fuel oil fill pipe comprising a coupling and nipple which is inserted between the existing oil fill pipe and the cap fitting. The coupling has a pair of apertures for inserting the lock pin through. The cover also has a pair of apertures co-aligned with the coupling apertures so that the lock pin can be inserted from the exterior passing through the coupling and extending beyond the cover's opposite side. The lock pin has a stop on one end and a transverse bore on the other so that when inserted through the cover and coupling a lock is inserted into the lock pin bore preventing removal of the lock pin.

2. Description of the Prior Art

There are other locking device designed for piping. Typical of these is U.S. Pat. No. 1,484,793 issued to Moore on Feb. 26, 1924.

Another patent was issued to Credle on Mar. 24, 1925 as U.S. Pat. No. 1,530,814. Yet another U.S. Pat. No. 1,690,461 was issued to Sieben on Nov. 6, 1928 and still yet another was issued on Jun. 10, 1930 to Wilhelm as U.S. Pat. No. 1,762, 371.

Another patent was issued to Doubble on Mar. 1, 1949 as U.S. Pat. No. 2,462,951. Yet another U.S. Pat. No. 2,623,380 was issued to Lee on Dec. 30, 1952. Another was issued to Eyster et al. on Sep. 23, 1980 as U.S. Pat. No. 4,223,799 and still yet another was issued on Oct. 4, 1983 to Nielsen, Jr. as U.S. Pat. No. 4,407,146.

Another patent was issued to Wang on Jul. 11, 2000 as U.S. Pat. No. 6,086,438. Yet another U.S. Pat. No. 6,260,874 was issued to Smith et al. on Jul. 17, 2001. Another was issued to Smith et al. on Jan. 18, 2005 as U.S. Pat. No. 6,843,083 and still yet another was published on Jun. 24, 2004 to Smith et al. as U.S. Patent Application Publication No. 2004/0118170. Another was issued to Strebor Diecasting Co. on Apr. 26, 1962 as U.K. Patent No. GB974,243 and still yet another was published on Mar. 25, 2004 to Desche as German Patent No. DE10237569.

U.S. Pat. No. 1,484,793 Inventor: James W. Moore
Issued: Feb. 26, 1924

A locked housing for pipe line valves comprising a base section which is adapted to engage under the valve, and two opposed hingedly supported sections mounted upon the base section and adapted to move in engagement with each other and assume positions over the pipe line valve, said hingedly supported sections adapted to move to positions laterally and upwardly, and means for locking the two hingedly supported sections together.

U.S. Pat. No. 1,530,814 Inventor: Walter C. Credle
Issued: Mar. 24, 1925

A guard for valves comprising a housing adapted to fit over the valve handle and rest upon the valve casing, arms permanently connected to the lower end of the housing at opposite sides of the same and adapted to fit over the valve casing, clamping plates adapted to bear against the lower portion of the valve casing at the opposite sides thereof and connected with the said arms, and means for locking the clamping plates together about the valve casing.

U.S. Pat. No. 1,690,461 Inventor: Henry Sieben
Issued: Nov. 6, 1928

A housing of the character described embodying a box provided with two open sides and having openings in its walls and comprising a plurality of sections separable through at least two of said openings, a cover for closing the open sides of the box, flanges on the cover and box adapted for interfitting relation when the cover is closed, and means for locking the cover to the box for maintaining the box and cover in interfitted relation.

U.S. Pat. No. 1,762,371 Inventor: John C. Wilhelm
Issued: Jun. 10, 1930

A device of the class described comprising a cup shaped member with a pair of spaced parallel coextensive plates rising therefrom on opposite sides and having apertures at their upper ends, a pin projecting through the apertures and an inverted cup shaped cap having a channel across the top thereof for receiving the pin, said pin having a head at one end and an opening at the other end, the opening being adapted to receive a locking means.

U.S. Pat. No. 2,462,951 Inventor: Peter Thorpe
Doubble Issued: Mar. 1, 1949

A locking means for oil drums and the like having a threaded outlet opening and a threaded vent opening, a plug adapted for insertion into the outlet opening, a vent plug adapted for insertion into the vent opening, each of said plugs having a transverse opening, a bar adapted for insertion through the openings, means for locking the bar against removal from the openings, said vent plug having a vent passage adapted to communicate with the interior of the drum and a valve adapted to close the vent passage in response to the insertion of the bar into the opening in the vent plug.

U.S. Pat. No. 2,623,380 Inventor: Thomas F. Lee
Issued: Dec. 30, 1952

A locking bonnet for a valve structure including a body, a pair of diametrically opposed fittings for said body, and an operating handle at the upper end of said structure, said bonnet comprising a hollow cylinder having a closed upper end and an open lower end, said cylinder having a pair of vertical slots extending from the bottom thereof in diametrically opposed relation, and further having a pair of openings in its lower portion also in diametrically opposed relation and each spaced equidistantly from said slots, a locking pin removably mounted in said openings, a head for said pin, a pair of ears affixed to the upper portion of said cylinder in diametrically opposed relation, a chain interconnecting one of said ears with said head, said pin having a transverse opening therethrough adjacent its free end, a padlock, and a chain interconnecting said padlock at one of its ends and said other ear at its other end.

U.S. Pat. No. 4,223,799 Inventor: Charles G. Eyster
et al. Issued: Sep. 23, 1980

The present invention pertains to releasable locking mechanism for a hollow circular member such as a fill pipe for an oil tank and cup-shaped closure cap of non-magnetic material which is connectable to the hollow circular member, in combination with a locking member of ferrous material supported by said cap for axial movement vertically relative to the cap and hollow circular member but non-rotatable relative to the cap, one end of the locking member having a configuration that is engageable with the hollow circular member in non-rotatable relationship to prevent rotation of the cap with respect to the hollow circular member when the locking member is in the latter position, the locking member being adapted to be raised from said locking engagement with the hollow circular member by a magnet which may be mounted within a wrench for use with the cap to remove the same from the hollow circular member.

U.S. Pat. No. 4,407,146 Inventor: Anker J. Nielsen, Jr. Issued: Oct. 4, 1983

A lock assembly for preventing the unauthorized disconnection of a gas line where it is connected to the gas meter. The lock assembly has telescoping male and female shrouds, a bolt type lock and an end cap inserted transversely through the side walls of the telescoped shrouds to lock the two shrouds together to securely enclose the gas line threaded connection, and two turned back ears on the male shroud closed end which cover the female shroud open end side edges to prevent the female shroud and the male shroud from being pried apart by a pair of screwdrivers or the like.

U.S. Pat. No. 6,086,438 Inventor: Calvin S. Wang Issued: Jul. 11, 2000

A propeller hitch cover (10) which stimulates a ship's propeller and is designed to be removably attached to a vehicle's trailer hitch (90). When the propeller hitch cover (10) is attached, it is positioned in the path of an air flow produced by the vehicle's forward motion. When the air impinges on the propeller's blades (54) the blades (54) rotate.

U.S. Pat. No. 6,260,874 Inventor: K. Wayne Smith et al. Issued: Jul. 17, 2001

A hitch cover includes a face plate and a wire form attached thereto for being inserted into the hitch tube and securing the face plate across the open end of the hitch tube. A lock or pin extending through the conventional hitch tube openings, passing through the wire form prevents removal of the hitch cover and protects against rattling of the wire from within the tube.

U.S. Pat. No. 6,843,083 Inventor: Mark R. Smith et al. Issued: Jan. 18, 2005

A lockable valve cover has a housing with an open end and a pair of opposing slots on opposite sides of the housing extending from the open end for engaging over spaced locations on a pipe on opposite sides of a valve over which the housing is placed, the pipe extending in a first direction through the slots. A pair of openings on opposite sides of the housing are aligned in a second direction perpendicular to the first direction with a first opening being larger than a second opening, and a locking plate having a reduced width tongue engages across the housing through the openings, with the tongue projecting through the second opening. A padlock engages a hole in the tongue to lock the housing in place.

U.S. Patent Application Publication Number 2004/0118170 Inventor: Mark R. Smith et al. Published: Jun. 24, 2004

A lockable valve cover has a housing with an open end and a pair of opposing slots on opposite sides of the housing extending from the open end for engaging over spaced locations on a pipe on opposite sides of a valve over which the housing is placed, the pipe extending in a first direction through the slots. A pair of openings on opposite sides of the housing are aligned in a second direction perpendicular to the first direction with a first opening being larger than a second opening, and a locking plate having a reduced width tongue engages across the housing through the openings, with the tongue projecting through the second opening. A padlock engages a hole in the tongue to lock the housing in place.

U.K. Patent Number GB974,243 Inventor: Strebor Diecasting Company Published: Apr. 26, 1962

A locking device for an inlet pipe 1 of a fuel tank provided with a removable filler cap 2, comprises a locking pin 14 adapted to be located in locking relationship with the cap, rotatable means 5 actuated by a key 7 to enable the pin to be released from locking relationship with the cap, and means for trapping the key 7 in the unlocked position and for releasing the key 7 in the locking position such that removal or replacement of the filler cap is possible only when the key is trapped. As shown in FIGS. 2, 3, a cam 8 having a cut-away portion 9 is secured to the back of the lock plug 5, and is positioned adjacent a recess 11, supporting a steel ball 10, of a U-shaped plunger 12. The other limb of the plunger forms the locking pin 14 and is located, in the locking position, in a recess in an arm 2a of the cap 2. On rotation of the key 7 portion 9 of the cam plate 8 lies adjacent the recess 11, so that on raising the plunger 12 to release arm 2a of the cap 2, the ball 10 falls into portion 9 thus preventing further rotation of cam plate 8 and removal of the key 7. In a second embodiment, see FIG. 6, the locking pin 14 is formed with a groove which retains a projection 23 of a crankpin 8 secured to the lock plug 5, so that in the locked position the pin 14 is extended as in FIG. 6, but on rotation of the key 7 to the unlocked position the pin 14 is withdrawn into the recess 20. In this embodiment a hinged cover plate 24 may be provided.

German Patent Number DE10237569 Inventor: Peter Desche Published: Mar. 25, 2004

Securing device for a cover lock, especially for a water channel cover lock, comprises a flange (5) fixed to a cover (1) and having at least two diametrically opposite fixing bolts (8). An opening closed by a cap (4) passes through the flange and receives a locking bolt of the cover lock. Vertical columns (2) removably fixed to the fixing bolts have bores extending perpendicular to the column longitudinal axis and parallel to the flange surface which receive a locking pin (3) so that it is located above the upper edge of the cap. Its longitudinal axis lies over the center of the cap and its position is secured using a padlock (6) in at least one column.

While these locking devices may be suitable for the purposes for which they were designed, they would not be as suitable for the purposes of the present invention, as hereinafter described.

SUMMARY OF THE PRESENT INVENTION

A primary object of the present invention is to provide a locking mechanism for a home heating oil fill port.

Another object of the present invention is to provide a locking mechanism having a coupling that is positioned between the existing cap fitting and the oil fill pipe.

Yet another object of the present invention is to provide a coupling having a pair of opposing wall apertures for the passage of a lock pin.

Still yet another object of the present invention is to provide a cover that fits over the oil fill pipe fitting to prevent access thereto.

Another object of the present invention is to provide a cover having opposing wall apertures for inserting a lock pin therethrough.

Yet another object of the present invention is to provide a lock pin having a lock stop on one end and a transverse bore in the other end for inserting a lock therein.

Still yet another object of the present invention is to provide an oil fill port locking mechanism having a lock preventing access to the oil fill port and fitting without the lock combination or key required to remove the lock pin.

Additional objects of the present invention will appear as the description proceeds.

The present invention overcomes the shortcomings of the prior art by providing an oil fill-port cover that is retrofitted to a home fuel oil fill pipe comprising a coupling and nipple which is inserted between the existing oil fill pipe and the cap fitting. The coupling has a pair of apertures for inserting the lock pin through. The cover also has a pair of apertures co-aligned with the coupling apertures so that the lock pin can be inserted from the exterior passing through the coupling and extending beyond the cover's opposite side. The lock pin has a stop on one end and a transverse bore on the other so that when inserted through the cover and coupling a lock is inserted into the lock pin bore preventing removal of the lock pin.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
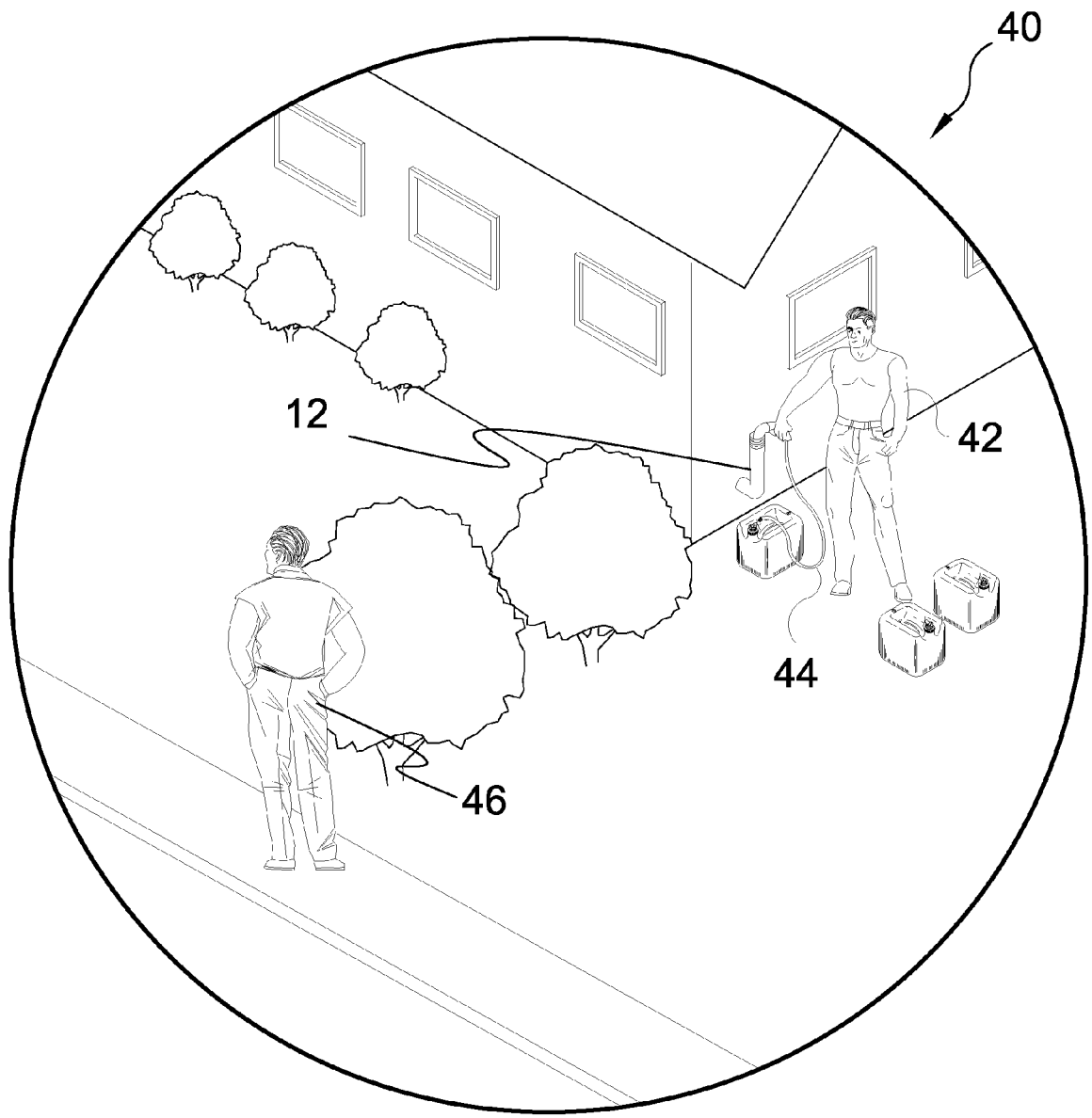
FIG. 1 is an illustrative view of prior art.

Turning now descriptively to the drawings, in which similar reference characters denote similar elements throughout the several views, the figures illustrate the Locking Mechanism for Home Heating Fuel Fill Pipe of the present invention. With regard to the reference numerals used, the following numbering is used throughout the various drawing figures.

10 Locking Mechanism for Home Heating Fuel Fill Pipe of the present invention
12 fill pipe
14 fill pipe cover
16 lockpin
18 lock pin bore
20 cover aperture
22 lock pin stop
24 padlock
26 fill pipe cap
28 cap fitting
30 nipple
32 coupling
34 lock pin aperture
36 locktite
38 spot weld
40 prior art
42 fuel oil thief
44 siphon/pump
46 lookout
48 fuel tank
50 exterior
52 basement
54 underground
56 pipe liner

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of prior art 40. Most homes that are heated by fuel oil have a fuel oil fill pipe 12 used by the oil companies that deliver the fuel to fill the homeowner's oil tank. Most of these fill pipes 12 have a threaded cap that is removed to allow the oil truck nozzle to be inserted so oil can be pumped from the delivery truck to the home oil storage tank, then the cap is screwed back on the pipe, anyone can gain access to the oil fill pipe 12 and can easily siphon or pump fuel from the tank, 5, 10 or 15 gallons per week without the homeowner ever knowing. Shown is a fuel oil thief 42 using a siphon 44 to steal fuel while a lookout 46 watches on.

Figure 2:
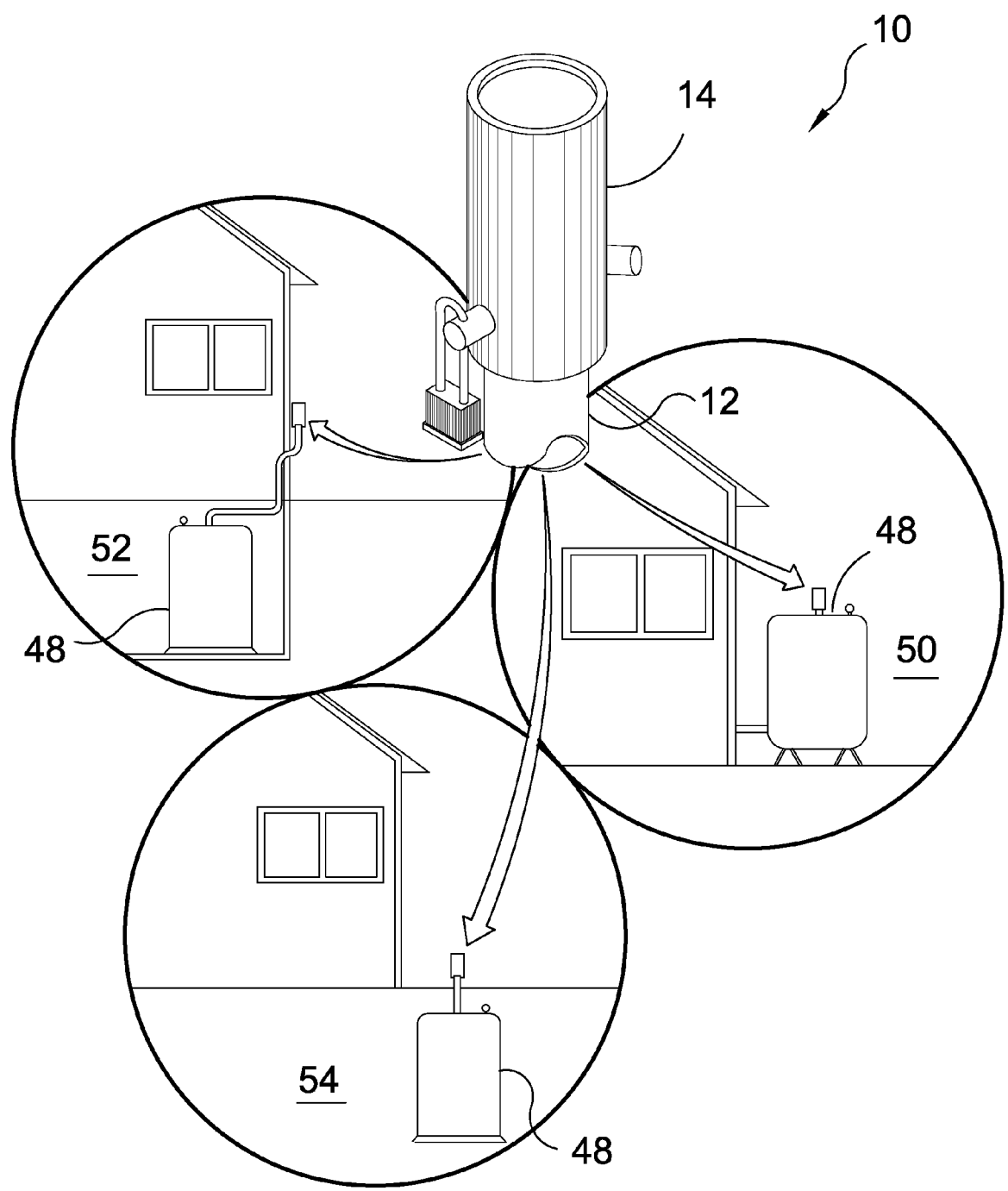
FIG. 2 is an illustrative view of the present invention in use.

FIG. 2 is an assembled perspective view of the present invention 10. The present invention 10 is an oil fill-port cover 14 that is retrofitted to a home owner fuel oil fill pipe 12 comprising a coupling and nipple which is inserted between the existing oil fill pipe and the cap fitting. The coupling has a pair of apertures for inserting the lock pin through. The cover also has a pair of apertures co-aligned with the coupling apertures so that the lock pin can be inserted from the exterior passing through the coupling and extending beyond the cover's opposite side. The lock pin has a stop on one end and a transverse bore on the other so that when inserted through the cover and coupling a lock is inserted into the lock pin bore preventing removal of the lock pin. Shown is the fill port cover 14 of the present invention 10 secured to fill pipe 12 of fuel tanks 48 located in the exterior 50, the basement 52 and underground 54.

Figure 3:
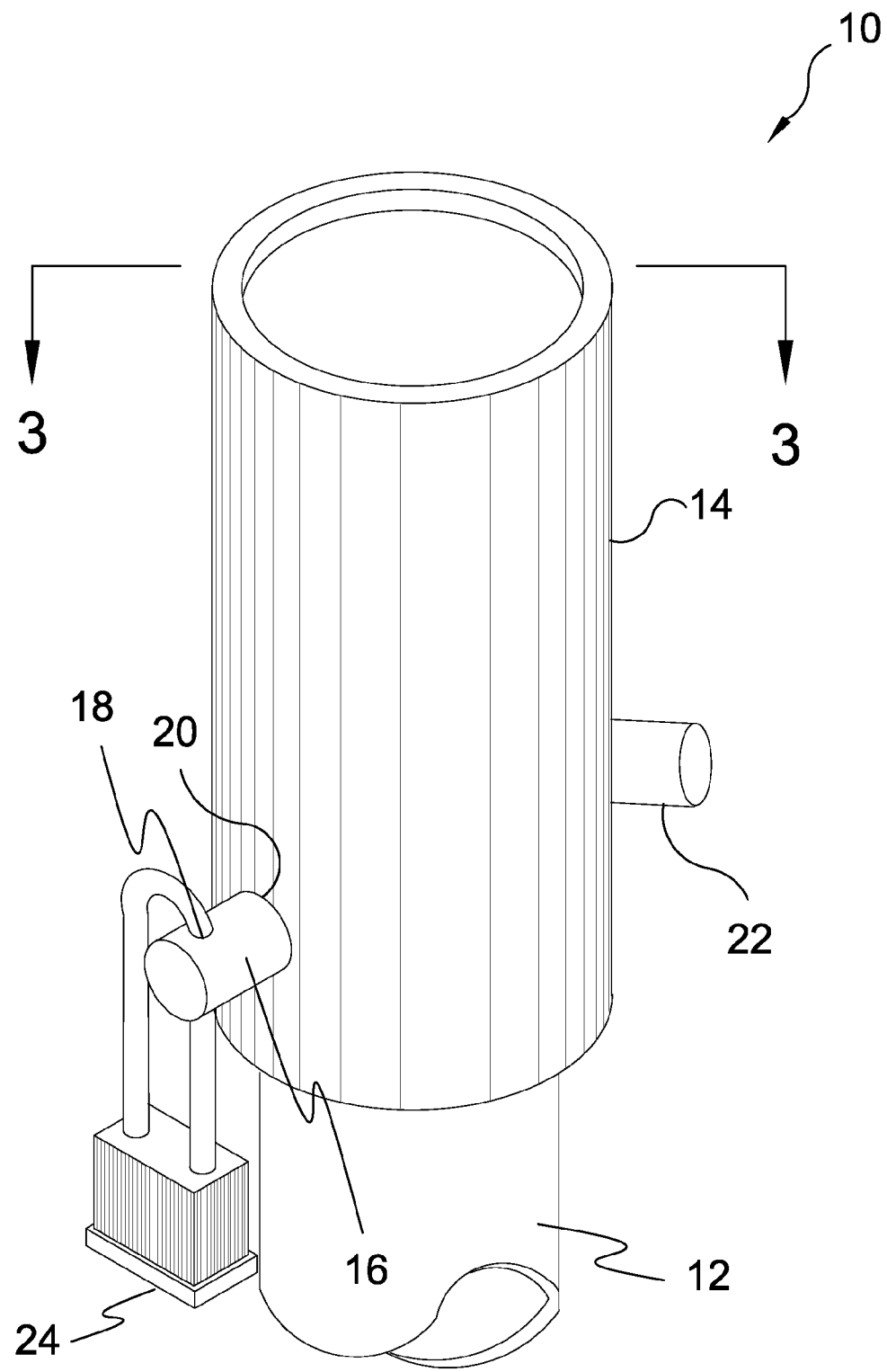
FIG. 3 is an assembled perspective view of the present invention.

FIG. 3 is an illustrative view of the present invention 10 in use. The present invention 10 is an oil fill-port cover 14 that is retrofitted to a home owner fuel oil fill pipe comprising a coupling and nipple which is inserted between the existing oil fill pipe 12 and the cap fitting. The coupling has a pair of apertures for inserting the lock pin 16 through. The cover 14 has a pair of cover apertures 20 co-aligned with the coupling apertures so that the lock pin 16 can be inserted from the exterior passing through the coupling and extending beyond the cover's 14 opposite side. The lock pin 16 has an angular lock pin stop 22 on one end and a transverse bore 18 on the other so that when inserted through the cover 14 and coupling a lock 24 is inserted into the lock pin bore 18 preventing removal of the lock pin 16.

Figure 4:
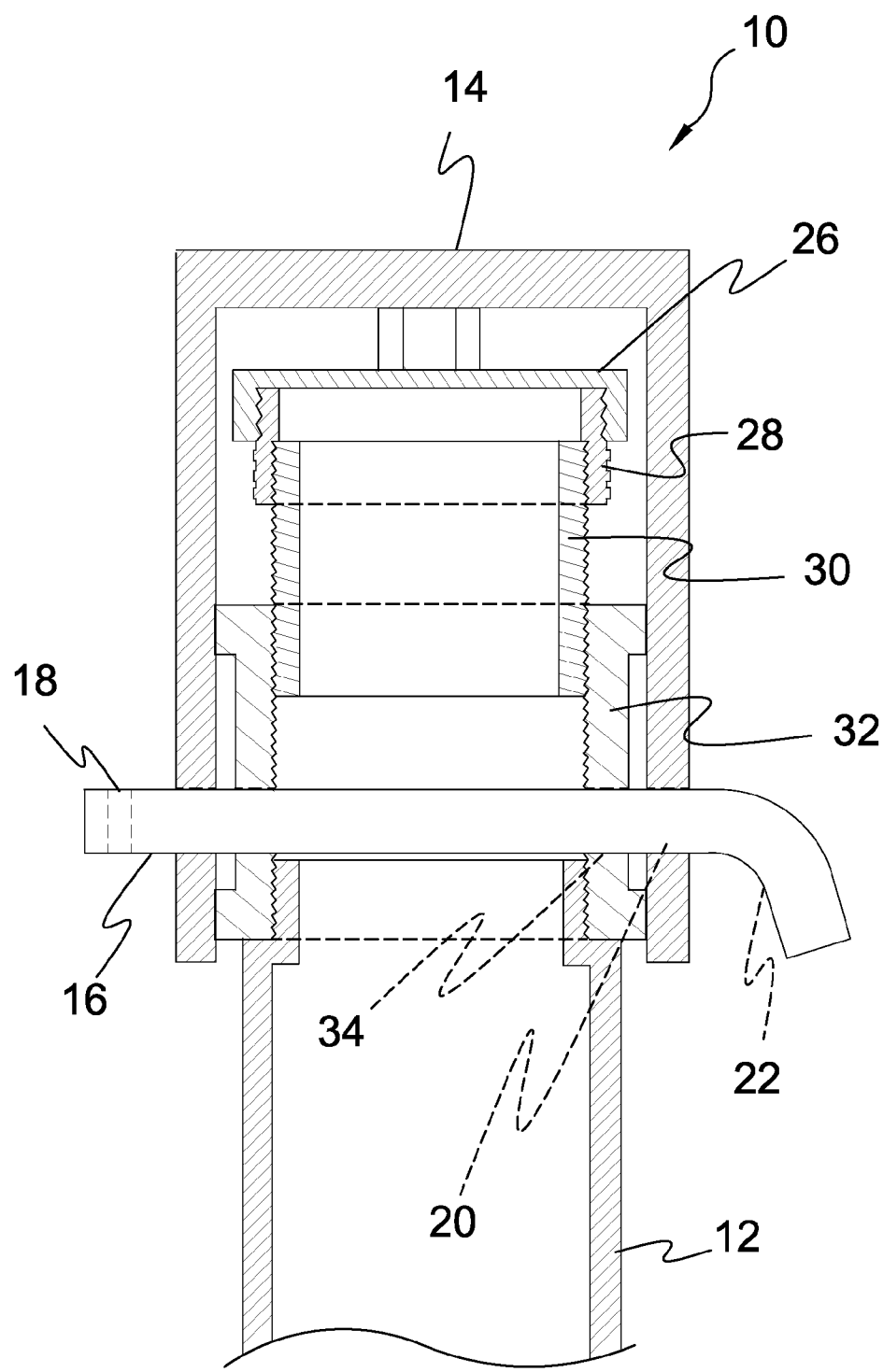
FIG. 4 is a cross sectional view of the present invention.

FIG. 4 is a cross sectional view of the present invention 10 taken from FIG. 3 as indicated. Conventionally the oil fill pipe 12 has a cap fitting 28 and fill cap 26 threadedly attached to the oil fill pipe 12. The present invention 10 removes the cap fitting 28 and cap 26 then threadedly attaches a coupling 32 having a pair of apertures 34 passing through the wall and then threadedly attaches a nipple 30 whereby the cap fitting 28 and cap 26 can then be reattached. Once assembled the coupling 32 provides means for securing the oil fill-port cover 14 to the coupling 32 by inserting the lock pin 16 through cover 14 and coupling 32 until extended through the other cover aperture 20. The lock pin 16 has a stop 22 on one end and a transverse bore 18 on the other for attaching a lock thereto preventing access to all pipe fittings and cap 26. It is envisioned that the lock can be a combination or key lock as desired.

Figure 5:
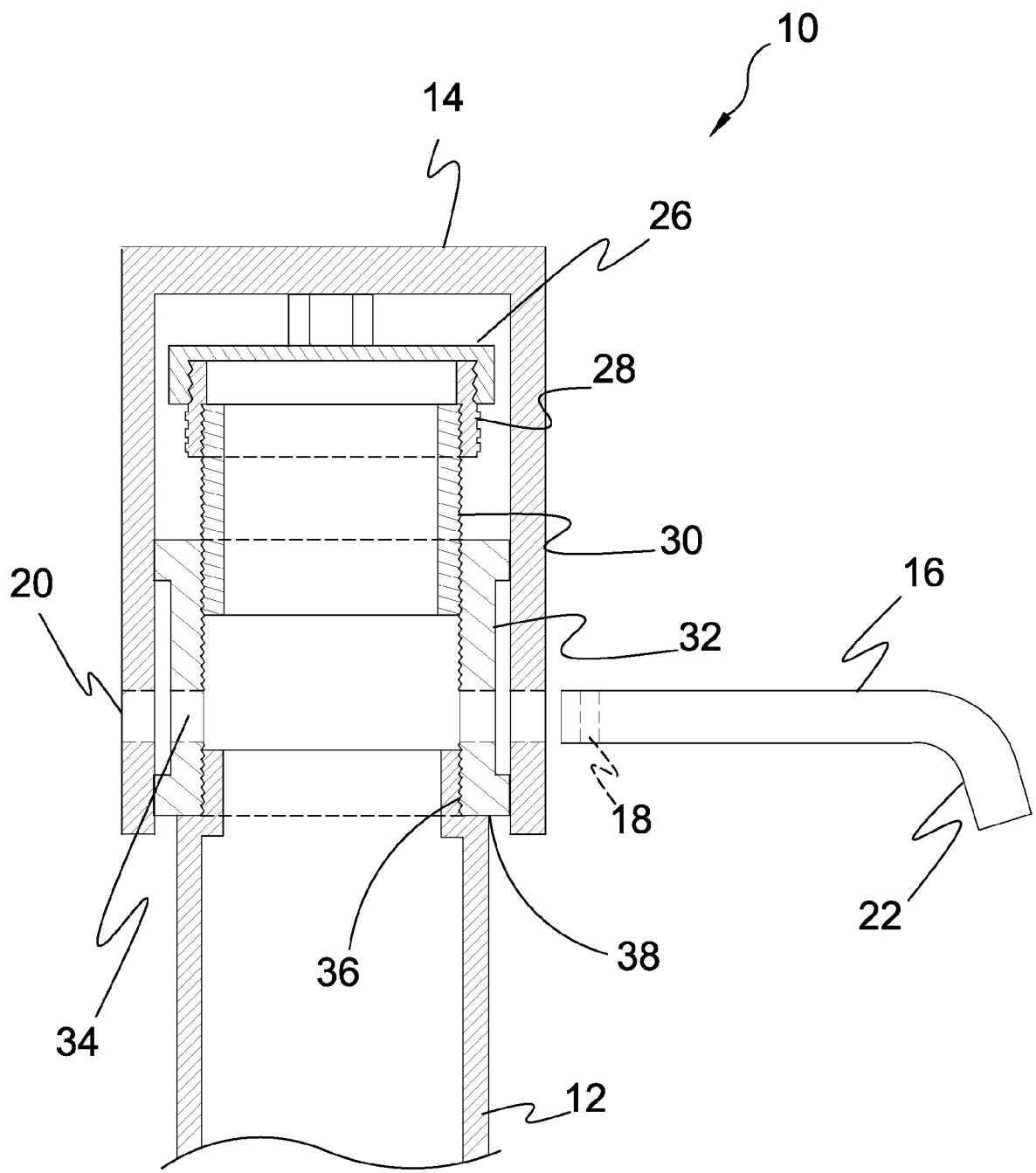
FIG. 5 is a sectional view of the present invention.

FIG. 5 is a sectional view of the present invention 10. Depicted is the lock pin 16 removed from its seating within coupling 32 and cover 14. The present invention 10 provides a coupling 32 with a pair of wall positioned apertures 34 and nipple 30. In operation the cap 26 and cap fitting 28 are removed from the oil fill pipe 12 with the coupling 32 then threaded thereon having similar threading as the recently removed cap fitting 28. The nipple 30 is then threaded into the coupling 32 having similar threading as that of the oil fill pipe 12 providing for reattachment of the cap fitting 28 and cap 26. Providing a high hat cover 14 with mating apertures 20 as that of the coupling 32, the cover 14 extending over all of the pipe fittings prevents access to all fittings in addition to the cover 14. It is further provided that the coupling 32 may use locktite threadlocker 36 or spot welding 38 to prevent removal of the coupling 32 from the oil fill pipe 12. Once securely fastened the cover 14 is easily attached to cover all the fitting and prevented from removal by insertion of the lock pin 16 and application of a lock through the lock pin bore 18.

Figure 6:
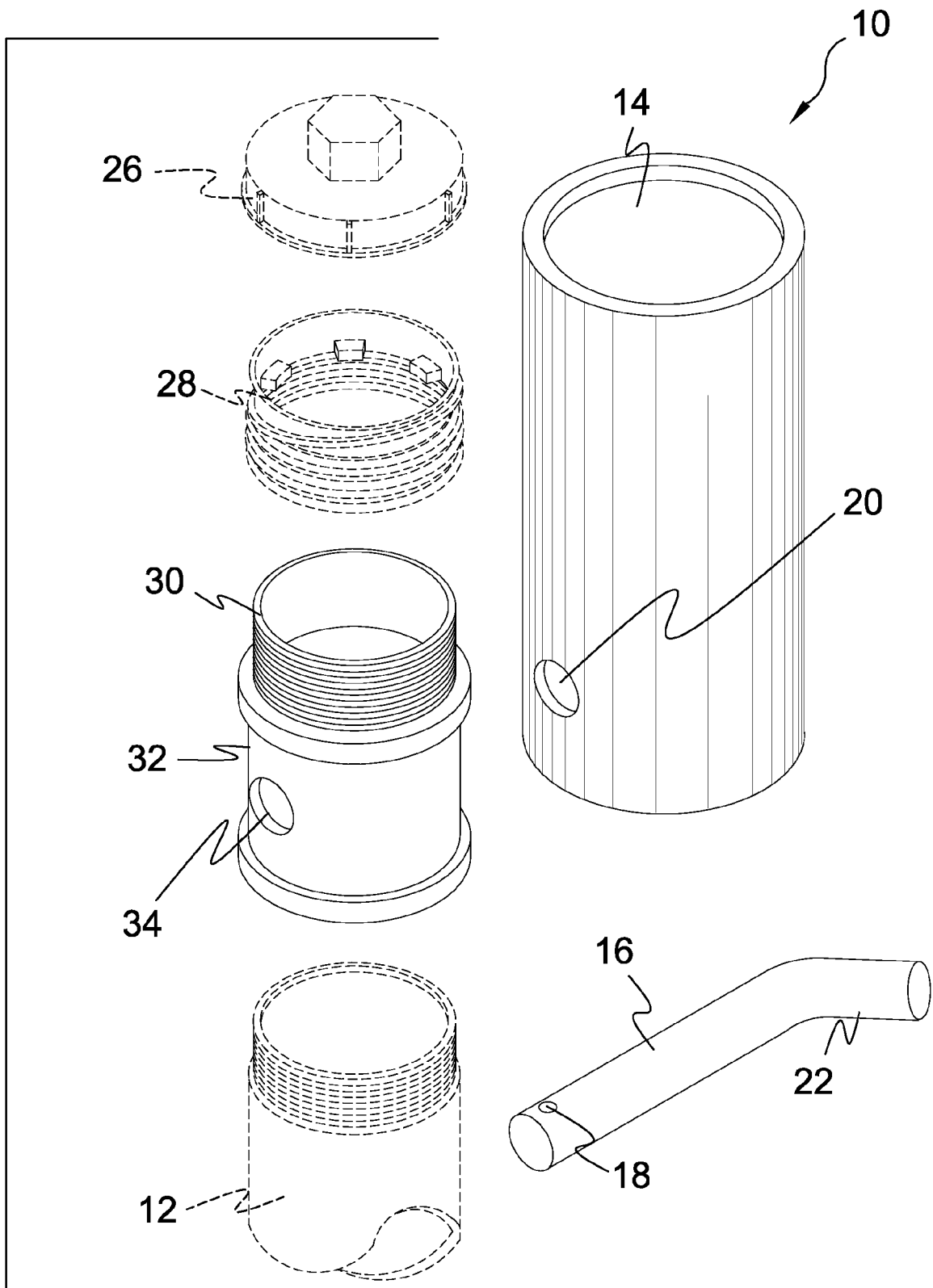
FIG. 6 is an exploded perspective view of the present invention.

FIG. 6 is an exploded perspective view of the present invention 10. The present invention 10 is an oil fill-port cover 14 comprising a coupling 32 and nipple 30 which is inserted between the existing oil fill pipe and the cap fitting 26. The coupling 32 has a pair of apertures 34 and the cover 14 also has a pair of apertures 20 co-aligned with the coupling apertures 34 so that the lock pin 16 can be inserted from the exterior passing through the coupling 32 and extending beyond the cover's 14 opposite side. The lock pin 16 has a stop 22 on one end and a transverse bore 18 on the other so that when inserted through the cover 14 and coupling 32 a lock is inserted into the lock pin bore 18 preventing removal of the lock pin 16.

Figure 7:
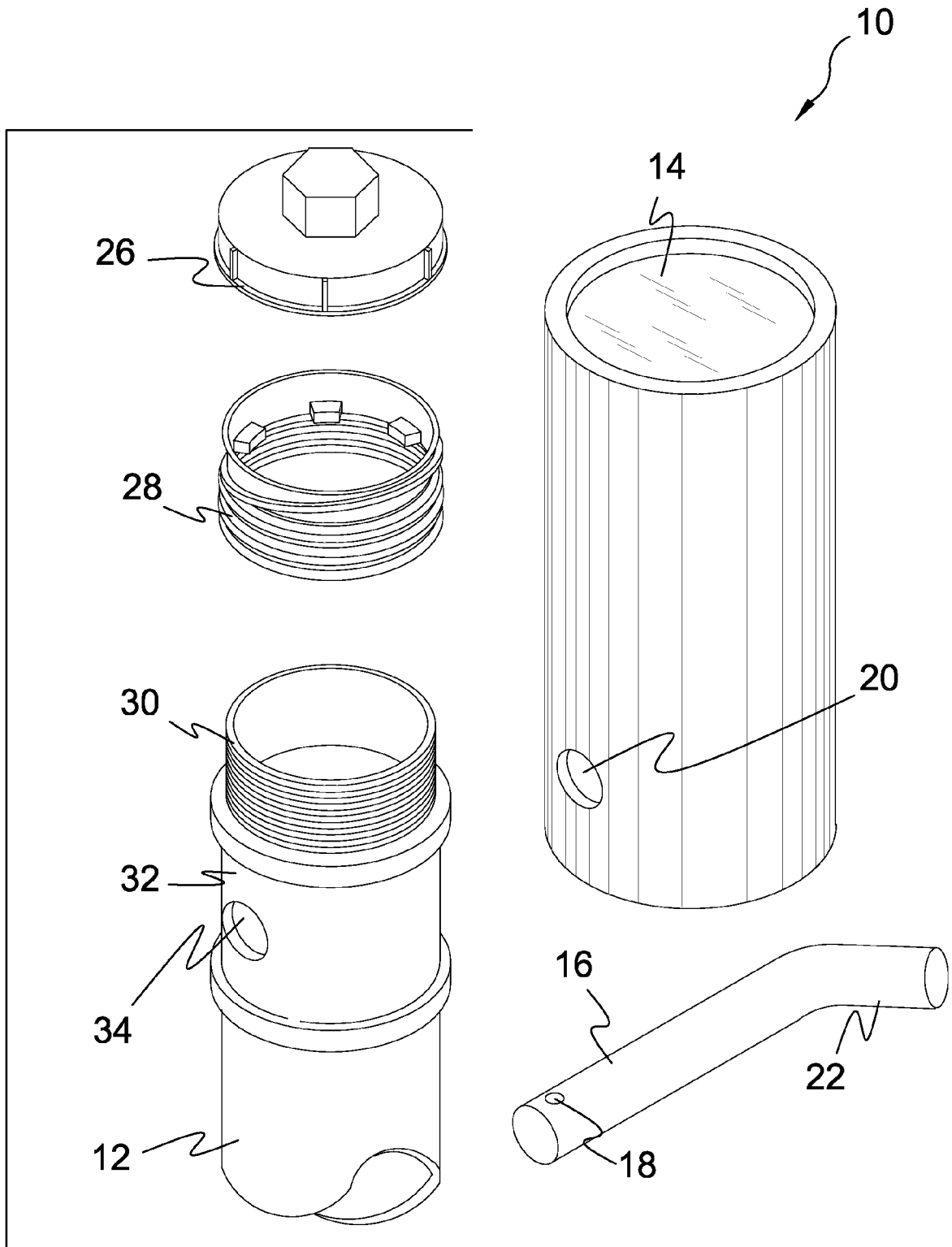
FIG. 7 is a partial exploded perspective view of the present invention.

FIG. 7 is a partial exploded perspective view of the present invention 10. Shown is a partial assembly of the oil fill-port cover 14 with the coupling 32 attached to the existing oil fill pipe 12. The oil port covering device comprises a coupling 32 and nipple 30 which is inserted between the existing oil fill pipe 12 and the cap fitting 28. The coupling 32 has a pair of apertures 34 and the cover 14 also has a pair of apertures 20 co-aligned with the coupling apertures 34 so that the lock pin 16 can be inserted from the exterior passing through the coupling 32 and extending beyond the cover's 14 opposite side. The lock pin 16 has a stop 22 on one end and a transverse bore 18 on the other so that when inserted through the cover 14 and coupling 32 a lock is inserted into the lock pin bore 18 preventing removal of the lock pin 16.

Figure 8:
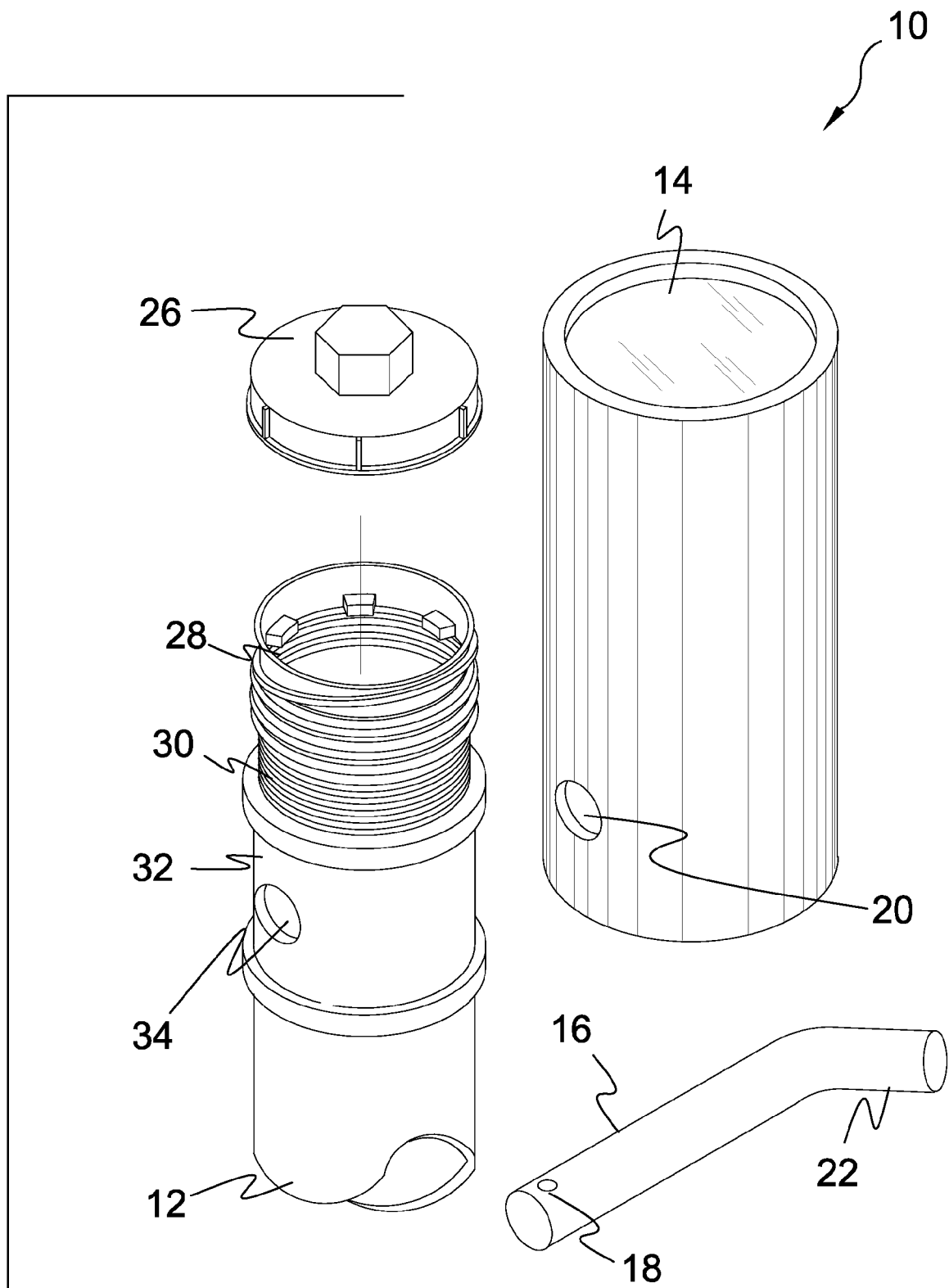
FIG. 8 is a partial exploded perspective view of the present invention.

FIG. 8 is a partial exploded perspective view of the present invention 10. Shown is a further partial assembly of the oil fill-port cover 14 with the coupling 32 attached to the existing oil fill pipe 14 and the existing cap fitting 28 attached to the nipple 30. The oil port covering device comprises a coupling 32 and nipple 30 which is inserted between the existing oil fill pipe 14 and the cap fitting 28. The coupling 32 has a pair of apertures 34 and the cover 14 also has a pair of apertures 20 co-aligned with the coupling apertures 34 so that the lock pin 16 can be inserted from the exterior passing through the coupling 32 and extending beyond the cover's 14 opposite side. The lock pin 16 has a stop 22 on one end and a transverse bore 18 on the other so that when inserted through the cover 14 and coupling 32 a lock is inserted into the lock pin bore 18 preventing removal of the lock pin 16.

Figure 9:
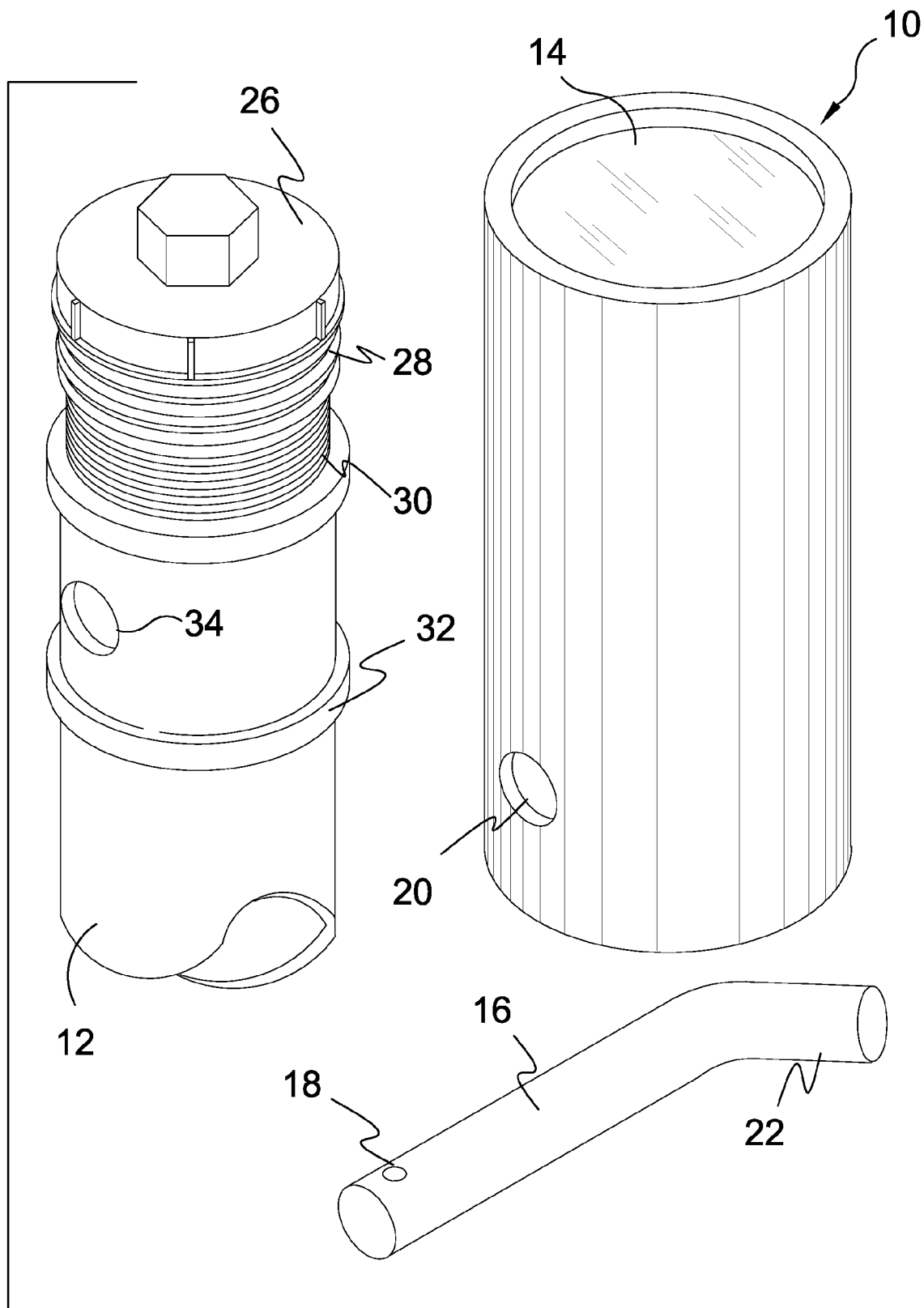
FIG. 9 is a partial exploded perspective view of the present invention.

FIG. 9 is a partial exploded perspective view of the present invention 10. Shown is a still further partial assembly of the oil fill-port cover 14 with the coupling 32 attached to the existing oil fill pipe 12 and the existing cap fitting 28 attached to the nipple 30 and the cap 26 threadedly attached to the cap fitting 28. The oil port covering device comprises a coupling 32 and nipple 30 which is inserted between the existing oil fill pipe 12 and the cap fitting 28. The coupling 32 has a pair of apertures 34 and the cover 14 also has a pair of apertures 20 co-aligned with the coupling apertures 34 so that the lock pin 16 can be inserted from the exterior passing through the coupling 32 and extending beyond the cover's 14 opposite side. The lock pin 16 has a stop 22 on one end and a transverse bore 18 on the other so that when inserted through the cover 14 and coupling 32 a lock is inserted into the lock pin bore 18 preventing removal of the lock pin.

Figure 10:
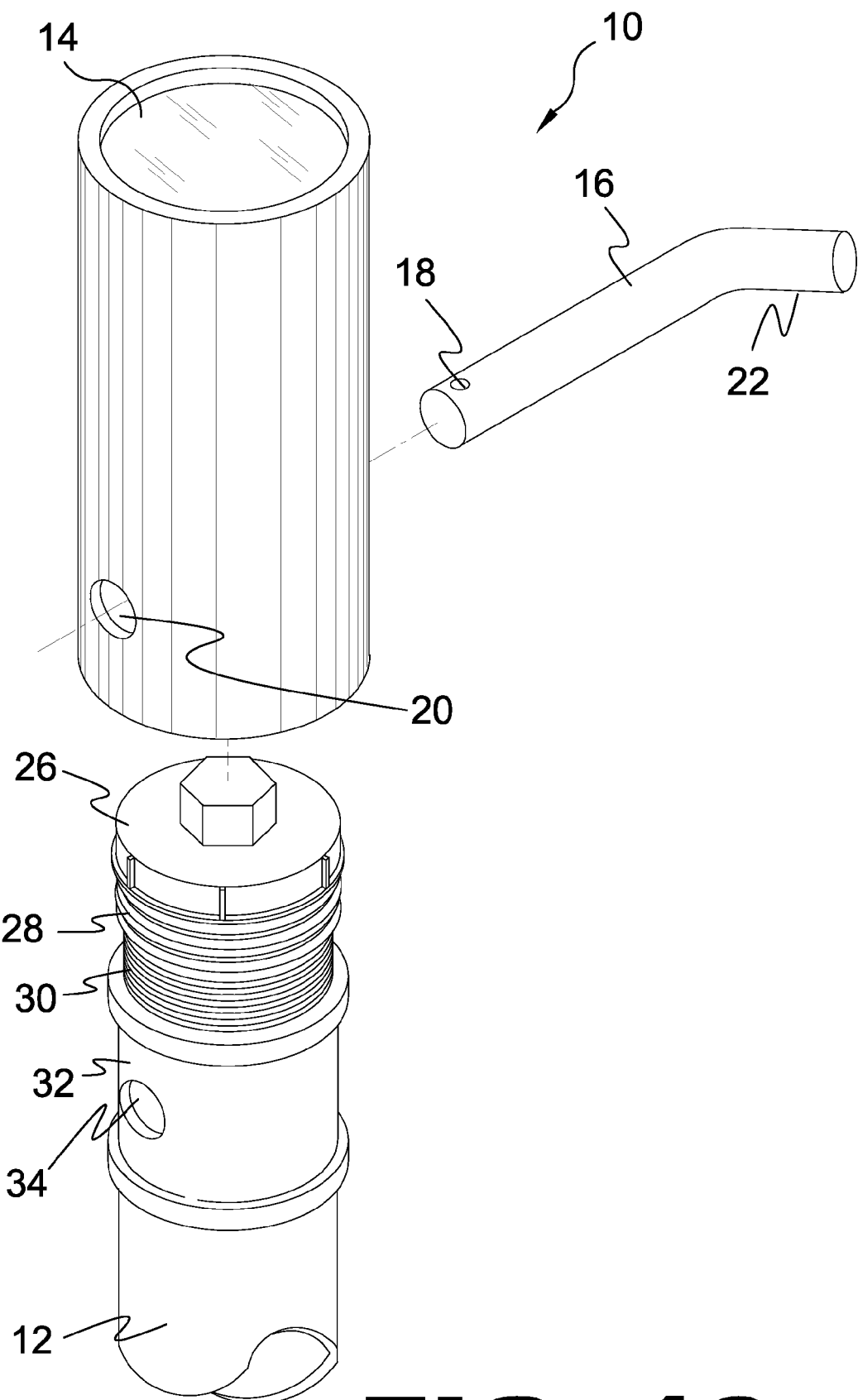
FIG. 10 is a partial exploded perspective view of the present invention.

FIG. 10 is a partial exploded perspective view of the present invention 10. Shown is a yet further partial assembly of the oil fill-port cover 14 with the coupling 32 attached to the existing oil fill pipe 12 and the existing cap fitting 28 attached to the nipple 30 and the cap 26 threadedly attached to the cap fitting 28 with the cover 14 and locking system in position for final assembly. The oil port covering device comprises a coupling 32 and nipple 30 which is inserted between the existing oil fill pipe 12 and the cap fitting 28. The coupling 32 has a pair of apertures 34 and the cover 14 also has a pair of apertures 20 co-aligned with the coupling apertures 34 so that the lock pin 16 can be inserted from the exterior passing through the coupling 32 and extending beyond the cover's 14 opposite side. The lock pin 16 has a stop 22 on one end and a transverse bore 18 on the other so that when inserted through the cover 14 and coupling 32 a lock is inserted into the lock pin bore 18 preventing removal of the lock pin 16.

Figure 11:
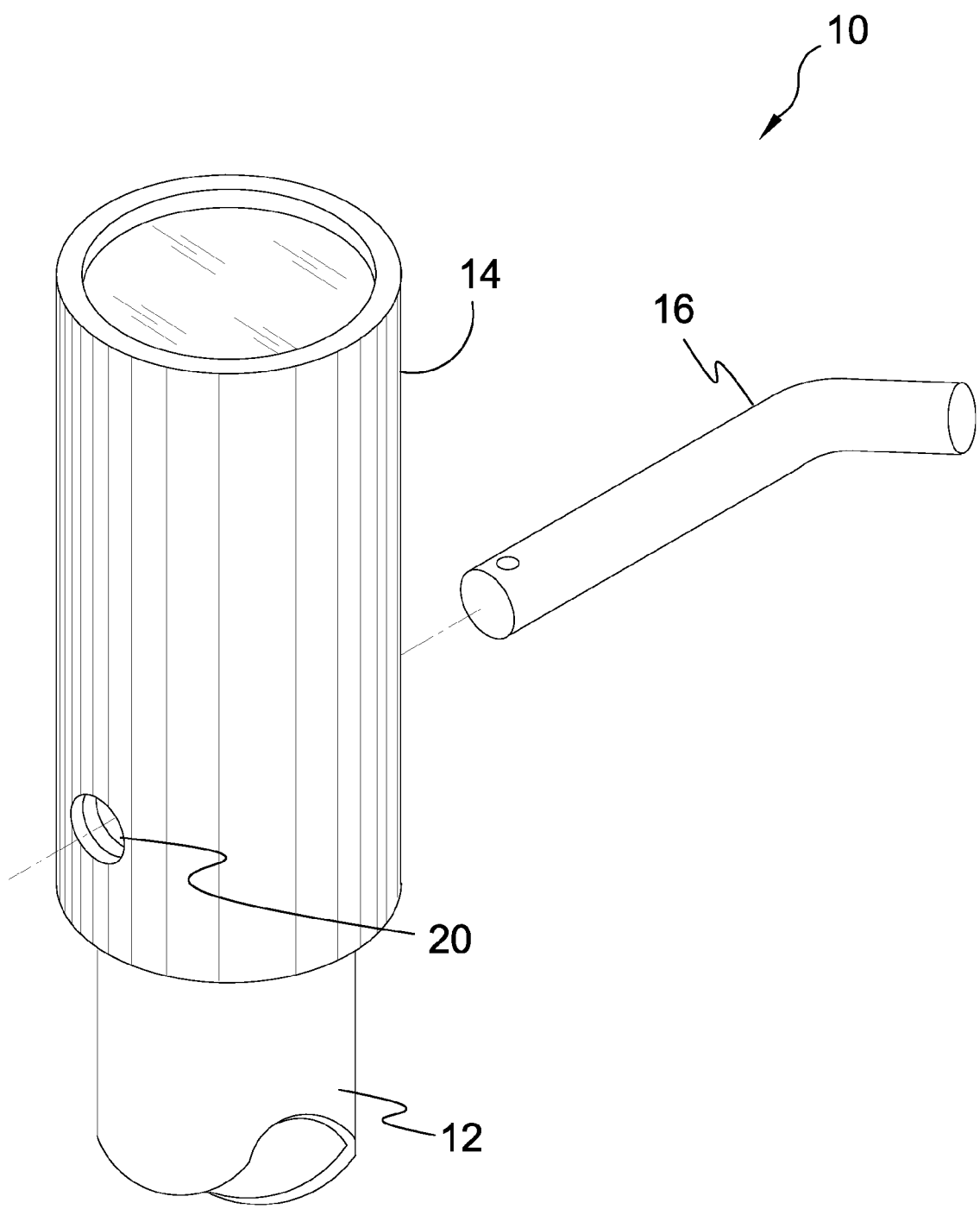
FIG. 11 is a partial exploded perspective view of the present invention.

FIG. 11 is a partial exploded perspective view of the present invention 10. Shown is yet another partial assembly of the oil fill-port cover with cover 14 positioned over the oil port fittings with the lock pin 16 ready for insertion into the lock pin aperture 20 for locking the assembly to the fill pipe 12.

Figure 12:
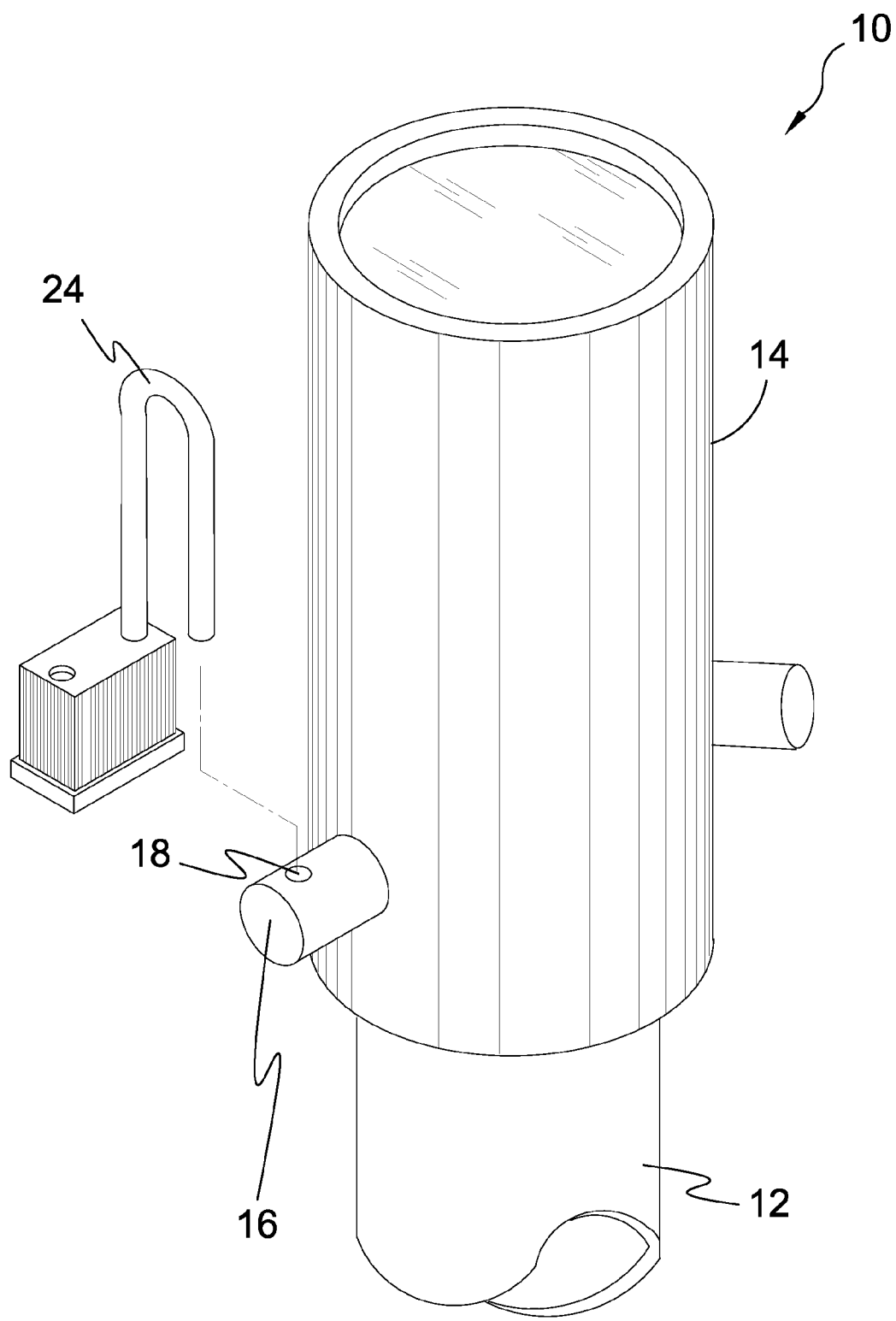
FIG. 12 is a partial exploded perspective view of the present invention.

FIG. 12 is a partial exploded perspective view of the present invention 10. Shown is the final assembly with the cover 14 positioned over the oil fill-port fittings and the lock pin 16 inserted through the cover 14 and coupling extending beyond the cover 14 whereby a padlock 24 can be inserted into the lock pin bore 18 preventing removal of the cover 14 from the fill pipe 12 without the lock key or combination.

Figure 13:
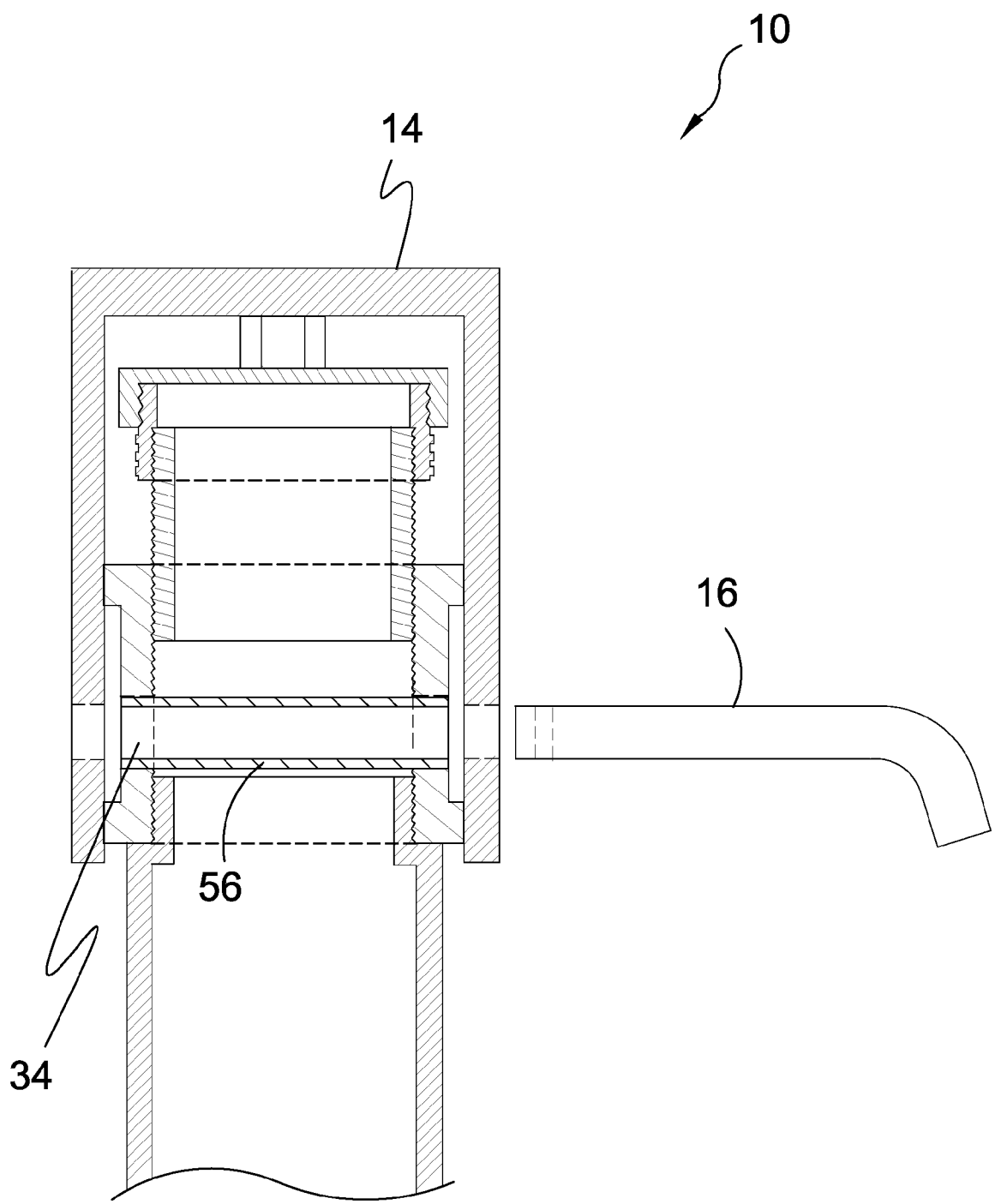
FIG. 13 is a sectional view of an additional element of the present invention.

FIG. 13 is a sectional view of an additional element of the present invention 10. Shown is an additional element of the present invention 10 comprising a pipe lining 56 fixed between the coupling apertures 34 sealing the aperture from any fuel passing through the apertures 34. The liner 56 allows the fuel to pass around the aperture lining 56 during a fueling process. The lock pin 16 will pass through the coupling aperture pipe lining 56.

Figure 14:
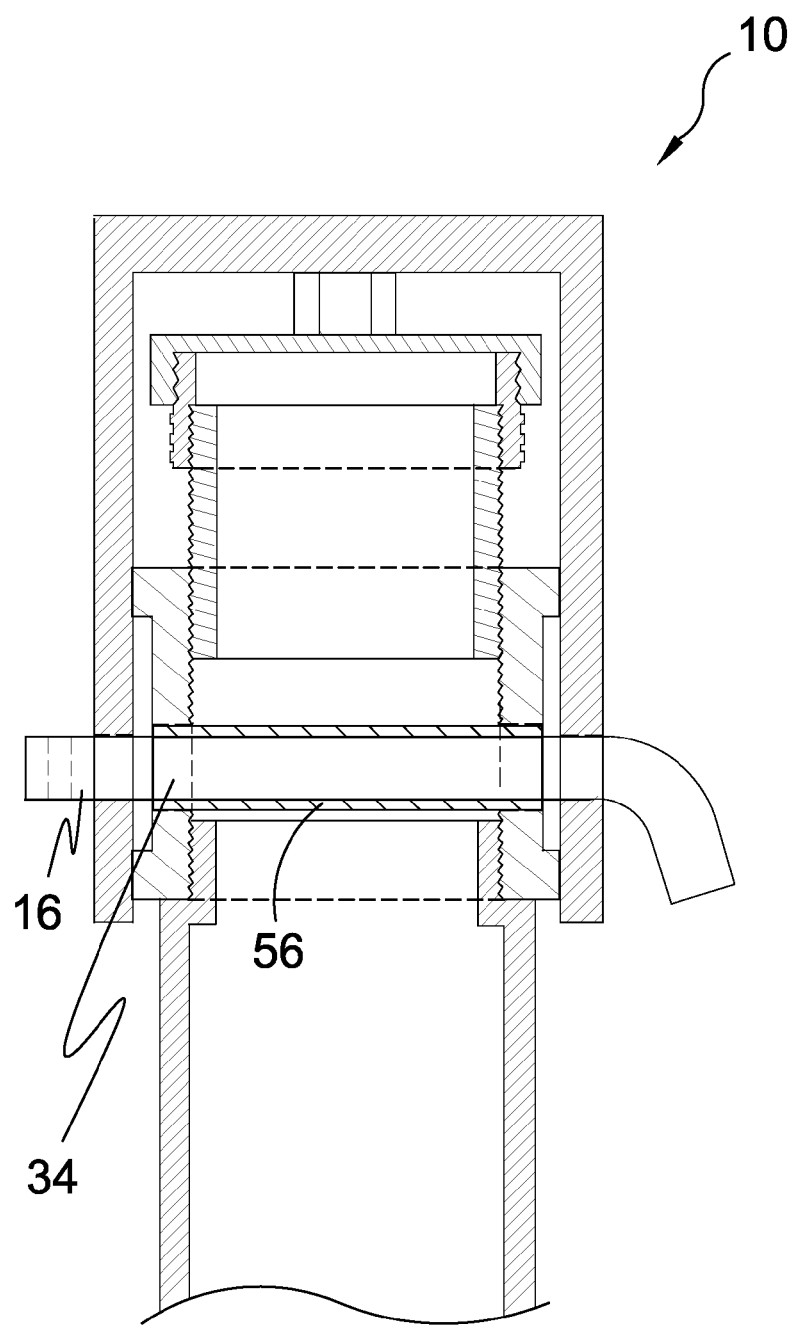
FIG. 14 is a sectional view of the additional element of the present invention.

FIG. 14 is a sectional view of the additional element of the present invention 10. Shown is the coupling aperture pipe lining 56 sealing the coupling aperture 34 from any fuel leakage while allowing the fuel to pass around the pipe lining 56. The pipe lining 56 is of sufficient diameter to allow free passage of the lock pin 16 during the locking process.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fuel oil fill-port locking mechanism for a threaded fuel oil fill pipe having a threaded cap fitting and a threaded cap comprising:
   a) a coupling having threads mateable with said fuel oil fill pipe;
   b) a nipple having outside threads mateable with said coupling and outside threads mateable with said cap fitting;
   c) an oil fill-port cover sized to fit over and prevent access to said cap, said cap fitting, said coupling and said nipple;
   d) a pair of apertures oppositely disposed in said coupling;
   e) a pair of apertures oppositely disposed in said cover, said pair of apertures in said cover co-alignable with said pair of apertures in said coupling;
   f) a lock pin sized to fit through and extend beyond said co-alignable pairs of apertures in said coupling and said cover;
   g) a transverse bore through one distal end of said lock pin; and
   h) a lock pin stop at an opposite distal end of said lock pin.

2. A fuel oil fill-port locking mechanism according to claim 1 wherein said coupling is securely affixed to said fuel oil fill pipe.

3. A fuel oil fill-port locking mechanism according to claim 2 wherein said coupling is securely affixed to said fuel oil fill pipe by means of a threadlocking material.

4. A fuel oil fill-port locking mechanism according to claim 2 wherein said coupling is securely affixed to said fuel oil fill pipe by means of a spot weld.

5. A fuel oil fill-port locking mechanism according to claim 2, further comprising a lock attachable through said transverse bore.

6. A fuel oil fill-port locking mechanism according to claim 2 wherein said lock pin is generally cylindrical.

7. A fuel oil fill-port locking mechanism according to claim 2 wherein said lock pin stop comprises a bend in said lock pin.

8. A fuel oil fill-port locking mechanism according to claim 5 wherein said lock pin is generally cylindrical.

9. A fuel oil fill-port locking mechanism according to claim 8 wherein said lock pin stop comprises a bend in said lock pin.

10. A fuel oil fill-port locking mechanism according to claim 2, further comprising a pipe lining fixed between said coupling apertures.

11. A method for preventing unwanted access to a threaded fuel oil fill pipe having a threaded cap fitting and a threaded cap comprising the steps:
   a) providing a fuel oil fill-port locking mechanism having a coupling with threads mateable with said fuel oil fill pipe; a nipple having outside threads mateable with said coupling and outside threads mateable with said cap fitting; an oil fill-port cover sized to fit over and prevent access to said cap, said cap fitting, said coupling and said nipple; a pair of apertures oppositely disposed in said coupling; a pair of apertures oppositely disposed in said cover, said pair of apertures in said cover co-alignable with said pair of apertures in said coupling; a lock pin sized to fit through and extend beyond said co-alignable pairs of apertures in said coupling and said cover; a transverse bore through one distal end of said lock pin; and a lock pin stop at an opposite distal end of said lock pin;
   b) removing the cap and the cap fitting from the fuel oil fill pipe;
   c) threading said coupling onto the fuel oil fill pipe;
   d) threading said nipple into said coupling;
   e) threading the cap fitting into said nipple;
   f) threading the cap into the cap fitting;
   g) placing said oil fill-port cover over said cap, said cap fitting, said coupling and said nipple;
   h) aligning said pair of apertures in said cover with said pair of apertures in said coupling;
   i) inserting said lock pin through said aligned pairs of apertures; and
   j) securing a lock through said lock pin bore to prevent removal of said lock pin.

12. A method for preventing unwanted access to a threaded fuel oil fill pipe according to claim 11, wherein said coupling is securely affixed to said fuel oil fill pipe.

13. A method for preventing unwanted access to a threaded fuel oil fill pipe according to claim 12, wherein said coupling is securely affixed to said fuel oil fill pipe by means of a threadlocking material.

14. A method for preventing unwanted access to a threaded fuel oil fill pipe having a threaded cap fitting and a threaded cap comprising the steps:
   a) providing a fuel oil fill-port locking mechanism having a coupling with threads mateable with said fuel oil fill pipe; a nipple having outside threads mateable with said coupling and outside threads mateable with said cap fitting; an oil fill-port cover sized to fit over and prevent access to said cap, said cap fitting, said coupling and said nipple; a pair of apertures oppositely disposed in said coupling; a pair of apertures oppositely disposed in said cover, said pair of apertures in said cover co-alignable with said pair of apertures in said coupling; a lock pin sized to fit through and extend beyond said co-alignable pairs of apertures in said coupling and said cover; a transverse bore through one distal end of said lock pin; and a lock pin stop at an opposite distal end of said lock pin;
   b) removing the cap and the cap fitting from the fuel oil fill pipe;
   c) threading said coupling onto the fuel oil fill pipe;
   d) threading said nipple into said coupling;
   e) threading the cap fitting into said nipple;
   f) threading the cap into the cap fitting;
   g) placing said oil fill-port cover over said cap, said cap fitting, said coupling and said nipple;
   h) aligning said pair of apertures in said cover with said pair of apertures in said coupling;
   i) inserting said lock pin through said aligned pairs of apertures;
   j) securing a lock through said lock pin bore to prevent removal of said lock pin; and
   wherein said coupling is securely affixed to said fuel oil fill pipe by means of a spot weld.

15. A method for preventing unwanted access to a threaded fuel oil fill pipe according to claim 12, further comprising a lock attachable through said transverse bore.

16. A method for preventing unwanted access to a threaded fuel oil fill pipe according to claim 12, wherein said lock pin is generally cylindrical.

17. A method for preventing unwanted access to a threaded fuel oil fill pipe according to claim 12, wherein said lock pin stop comprises a bend in said lock pin.

18. A method for preventing unwanted access to a threaded fuel oil fill pipe according to claim 15, wherein said lock pin is generally cylindrical.

19. A method for preventing unwanted access to a threaded fuel oil fill pipe according to claim 18, wherein said lock pin stop comprises a bend in said lock pin.

20. A method for preventing unwanted access to a threaded fuel oil fill pipe according to claim 12, further comprising a pipe lining fixed between said coupling apertures.

* * * * *